United States Patent
Shi et al.

(10) Patent No.: US 8,554,205 B2
(45) Date of Patent: Oct. 8, 2013

(54) METHODS AND APPARATUS FOR FACILITATING DYNAMIC SERVICE-BASED SYSTEM SELECTION AND DETERMINATION

(75) Inventors: Guangming Carl Shi, San Diego, CA (US); Kuo-Chun Lee, San Diego, CA (US); Steven Cheng, San Diego, CA (US); Isaac Ta-yan Siu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 12/256,882

(22) Filed: Oct. 23, 2008

(65) Prior Publication Data

US 2010/0105378 A1 Apr. 29, 2010

(51) Int. Cl.
  H04W 4/00 (2009.01)
  H04W 24/00 (2009.01)
  H04W 8/18 (2009.01)
  H04W 48/18 (2009.01)
  H04W 8/12 (2009.01)
  H04W 64/00 (2009.01)

(52) U.S. Cl.
  CPC ............. *H04W 8/183* (2013.01); *H04W 48/18* (2013.01); *H04W 8/12* (2013.01); *H04W 64/00* (2013.01)
  USPC ...................................... 455/432.1; 455/456.1

(58) Field of Classification Search
  USPC ............................................ 455/432.1, 456.1
  See application file for complete search history.

(56) References Cited

U.S. PATENT DOCUMENTS 6,208,857 B1  3/2001  Agre et al.
6,982,962 B1  1/2006  Lunsford et al.
(Continued)

FOREIGN PATENT DOCUMENTS

CN  1709007 A  12/2005
EP  1517572 A1  3/2005
(Continued)

OTHER PUBLICATIONS

International Search Report and Written Opinion—PCT/US2009/060637—ISAEPO—Feb. 5, 2010.
(Continued)

*Primary Examiner* — William D Cumming
(74) *Attorney, Agent, or Firm* — Tyler J. Overall

(57) ABSTRACT

A method for facilitating dynamic service-based system selection and determination may be implemented by a communications device. The method may include presenting system selection options to a user based on information that is received about Network Access Providers (NAPs) and Network Service Providers (NSPs). The method may also include receiving user input about the system selection options. The user may be permitted to provide input about specific services offered by specific NSPs. The method may also include determining user preferences regarding system selection based on the user input. The method may also include creating a preferred roaming list (PRL) based on the user preferences. The method may further include using the PRL to scan for available networks and channels and to find serving systems.

22 Claims, 9 Drawing Sheets

(56) References Cited

U.S. PATENT DOCUMENTS

| | | |
|---|---|---|
| 7,761,098 B1 | 7/2010 | Nguyen et al. |
| 2002/0029275 A1 | 3/2002 | Selgas et al. |
| 2002/0036658 A1 | 3/2002 | Carolan et al. |
| 2006/0052113 A1 * | 3/2006 | Ophir et al. ............... 455/456.1 |
| 2007/0255797 A1 | 11/2007 | Dunn et al. |
| 2008/0056286 A1 | 3/2008 | Forssell et al. |
| 2008/0062934 A1 | 3/2008 | Zhao |
| 2008/0095073 A1 | 4/2008 | Dang |
| 2008/0151851 A1 | 6/2008 | Sitch |
| 2008/0253322 A1 | 10/2008 | So et al. |
| 2010/0105378 A1 * | 4/2010 | Shi et al. .................... 455/432.1 |
| 2012/0122514 A1 | 5/2012 | Cheng et al. |

FOREIGN PATENT DOCUMENTS

| | | |
|---|---|---|
| JP | 2002199451 A | 7/2002 |
| JP | 2008141267 A | 6/2008 |
| WO | WO2004014098 | 2/2004 |
| WO | 2005004403 A1 | 1/2005 |
| WO | 2006136902 A1 | 12/2006 |
| WO | 2008096702 A1 | 8/2008 |

OTHER PUBLICATIONS

Taiwan Search Report—TW098135453—TIPO—Dec. 13, 2012.

* cited by examiner

METHODS AND APPARATUS FOR FACILITATING DYNAMIC SERVICE-BASED SYSTEM SELECTION AND DETERMINATION

TECHNICAL FIELD

The present disclosure relates generally to communication systems. More specifically, the present disclosure relates to methods and apparatus for facilitating dynamic service-based system selection and determination in wireless communication system.

In order to address the issue of increasing bandwidth requirements that are demanded for wireless communication systems, different schemes are being developed to allow multiple user terminals to communicate with a single access point (AP) by sharing the channel resources while achieving high data throughputs. In wireless networks with a single AP and multiple user stations (STAs), concurrent transmissions may occur on multiple channels toward different STAs, both in uplink and downlink directions.

Multi-mode mobile devices may be configured for operation in many networks, including, for example, 2G, 3G, and/or 4G. Many challenges are present in such systems.

BRIEF DESCRIPTION OF THE DRAWINGS

FIG. 4 illustrates an example of a method for facilitating dynamic service-based system selection and determination;

FIG. 5 illustrates means-plus-function blocks corresponding to the method of FIG. 4;

SUMMARY

Figure 1:
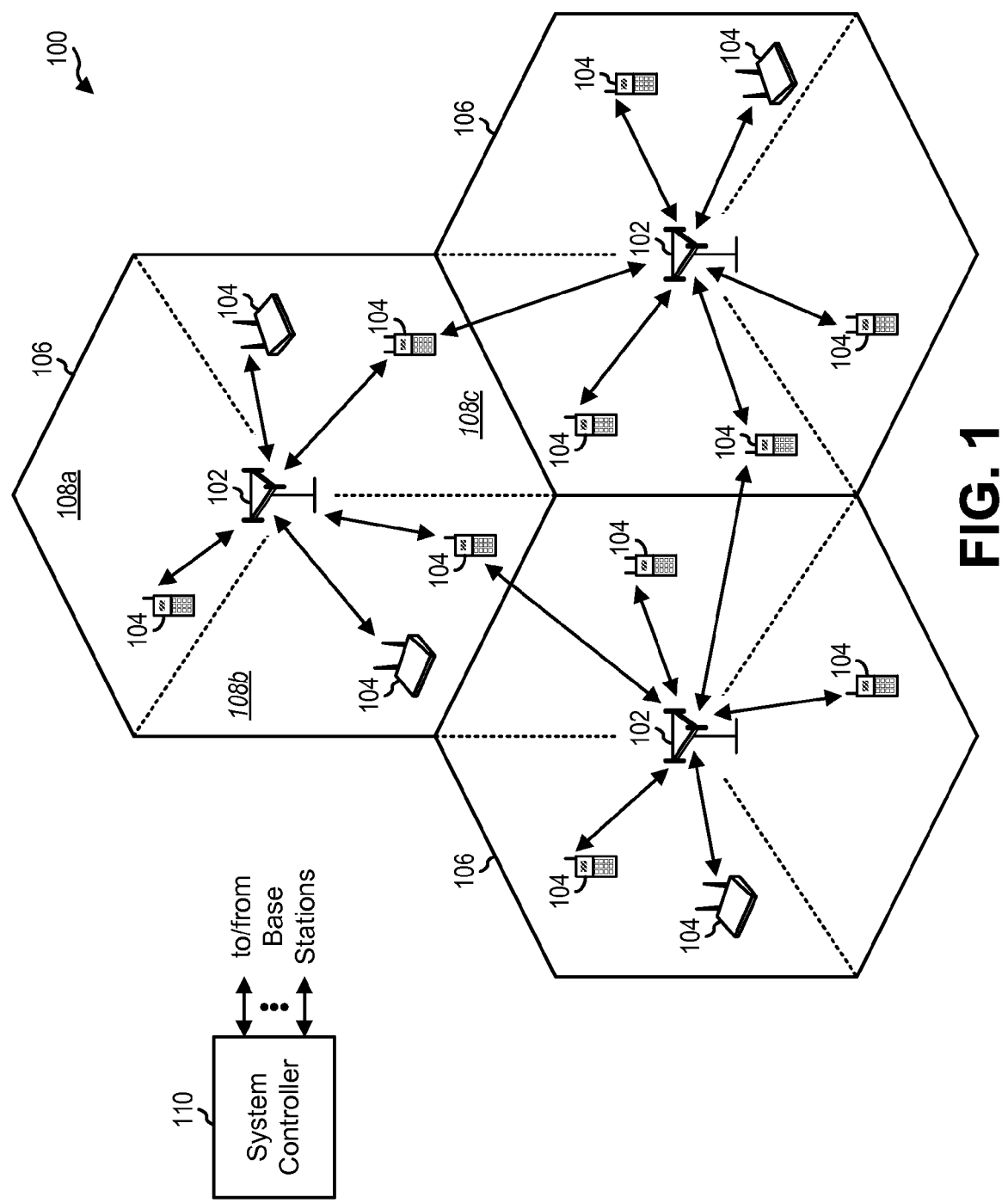
FIG. 1 illustrates a wireless communication system with multiple base stations and multiple mobile devices.

A method for facilitating dynamic service-based system selection and determination is disclosed. The method may be implemented by a mobile device. The method may include presenting system selection options to a user based on information that is received about Network Access Providers (NAPs) and Network Service Providers (NSPs). The method may also include receiving user input about the system selection options. The user may be permitted to provide input about specific services offered by specific NSPs. The method may also include determining user preferences regarding system selection based on the user input. The method may also include creating a preferred roaming list (PRL) based on the user preferences. The method may also include using the PRL to scan for available networks and channels and to find serving systems.

A mobile device configured for facilitating dynamic service-based system selection and determination is disclosed. The mobile device may include a processor. The mobile device may also include memory in electronic communication with the processor. The mobile device may also include instructions stored in the memory. The instructions may be executable by the processor to present system selection options to a user based on information that is received about Network Access Providers (NAPs) and Network Service Providers (NSPs). The instructions may also be executable to receive user input about the system selection options. The user may be permitted to provide input about specific services offered by specific NSPs. The instructions may also be executable to determine user preferences regarding system selection based on the user input. The instructions may also be executable to create a preferred roaming list (PRL) based on the user preferences. The instructions may further be executable to use the PRL to scan for available networks and channels and to find serving systems.

A mobile device configured for facilitating dynamic service-based system selection and determination is disclosed. The mobile device may include means for presenting system selection options to a user based on information that is received about Network Access Providers (NAPs) and Network Service Providers (NSPs). The mobile device may also include means for receiving user input about the system selection options. The user may be permitted to provide input about specific services offered by specific NSPs. The mobile device may also include means for determining user preferences regarding system selection based on the user input. The mobile device may also include means for creating a preferred roaming list (PRL) based on the user preferences. The mobile device may further include means for using the PRL to scan for available networks and channels and to find serving systems.

A computer-program product for facilitating dynamic service-based system selection and determination by a mobile device is disclosed. The computer-program product may include a computer-readable medium having instructions thereon. The instructions may include code for presenting system selection options to a user based on information that is received about Network Access Providers (NAPs) and Network Service Providers (NSPs). The instructions may also include code for receiving user input about the system selection options. The user may be permitted to provide input about specific services offered by specific NSPs. The instructions may also include code for determining user preferences regarding system selection based on the user input. The instructions may also include code for creating a preferred roaming list (PRL) based on the user preferences. The instructions may also include code for using the PRL to scan for available networks and channels and to find serving systems.

DETAILED DESCRIPTION

As used herein, the term "mobile device" refers to an electronic device that may be used for voice and/or data communication over a wireless communication network. Examples of mobile devices include cellular phones, personal digital assistants (PDAs), handheld devices, wireless modems, laptop computers, personal computers, etc. A mobile device may alternatively be referred to as an access terminal, a mobile terminal, a mobile station, a subscriber station, a remote station, a user terminal, a terminal, a subscriber unit, user equipment, etc.

A wireless communication network may provide communication for a number of mobile devices, each of which may be serviced by a base station. A base station may alternatively be referred to as an access point, a Node B, or some other terminology.

A mobile device may communicate with one or more base stations via transmissions on the uplink and the downlink. The uplink (or reverse link) refers to the communication link from the mobile device to the base station, and the downlink (or forward link) refers to the communication link from the base station to the mobile device.

The resources of a wireless communication network (e.g., bandwidth and transmit power) may be shared among multiple mobile devices. A variety of multiple access techniques are known, including code division multiple access (CDMA), time division multiple access (TDMA), frequency division multiple access (FDMA), and orthogonal frequency division multiple access (OFDMA).

The techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, Spatial Division Multiple Access (SDMA) systems, multiple-input multiple-output (MIMO) systems, and so forth. The terms "system" and "network" may be used interchangeably herein.

A CDMA system may implement a radio technology such as Universal Terrestrial Radio Access (UTRA), cdma2000, etc. UTRA includes Wideband CDMA (W-CDMA) and other CDMA variants. The cdma2000 technology covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), 802.11 (WiFi), Flash-OFDM®, etc.

UTRA and E-UTRA are part of UMTS. 3GPP Long Term Evolution (LTE) is a release of UMTS that uses E-UTRA. UTRA, E-UTRA, UMTS, LTE and GSM are described in documents from an organization named the "3rd Generation Partnership Project" (3GPP). UMB and cdma2000 are described in documents from an organization named the "3rd Generation Partnership Project 2" (3GPP2).

FIG. 1 shows a wireless communication system 100 with multiple base stations 102 and multiple mobile devices 104. A base station 102 is a station that communicates with the mobile devices 104. A base station 102 may also be called, and may contain some or all of the functionality of, an access point, a Node B, an evolved Node B, etc. Each base station 102 provides communication coverage for a particular geographic area 106. The term "cell" can refer to a base station 102 and/or its coverage area 106 depending on the context in which the term is used. To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Mobile devices 104 are typically dispersed throughout the system 100. A mobile device 104 may also be called, and may contain some or all of the functionality of, a terminal, an access terminal, a user equipment, a subscriber unit, a station, etc. A mobile device 104 may be a cellular phone, a personal digital assistant (PDA), a wireless device, a wireless modem, a handheld device, a laptop computer, etc. A mobile device 104 may communicate with zero, one, or multiple base stations 104 on the downlink (DL) and/or uplink (UL) at any given moment. The downlink (or forward link) refers to the communication link from the base stations 102 to the mobile devices 104, and the uplink (or reverse link) refers to the communication link from the mobile devices 104 to the base stations 102.

For a centralized architecture, a system controller 110 may couple to base stations 102 and provide coordination and control for these base stations 102. The system controller 110 may be a single network entity or a collection of network entities. For a distributed architecture, base stations 102 may communicate with one another as needed.

Figure 2:
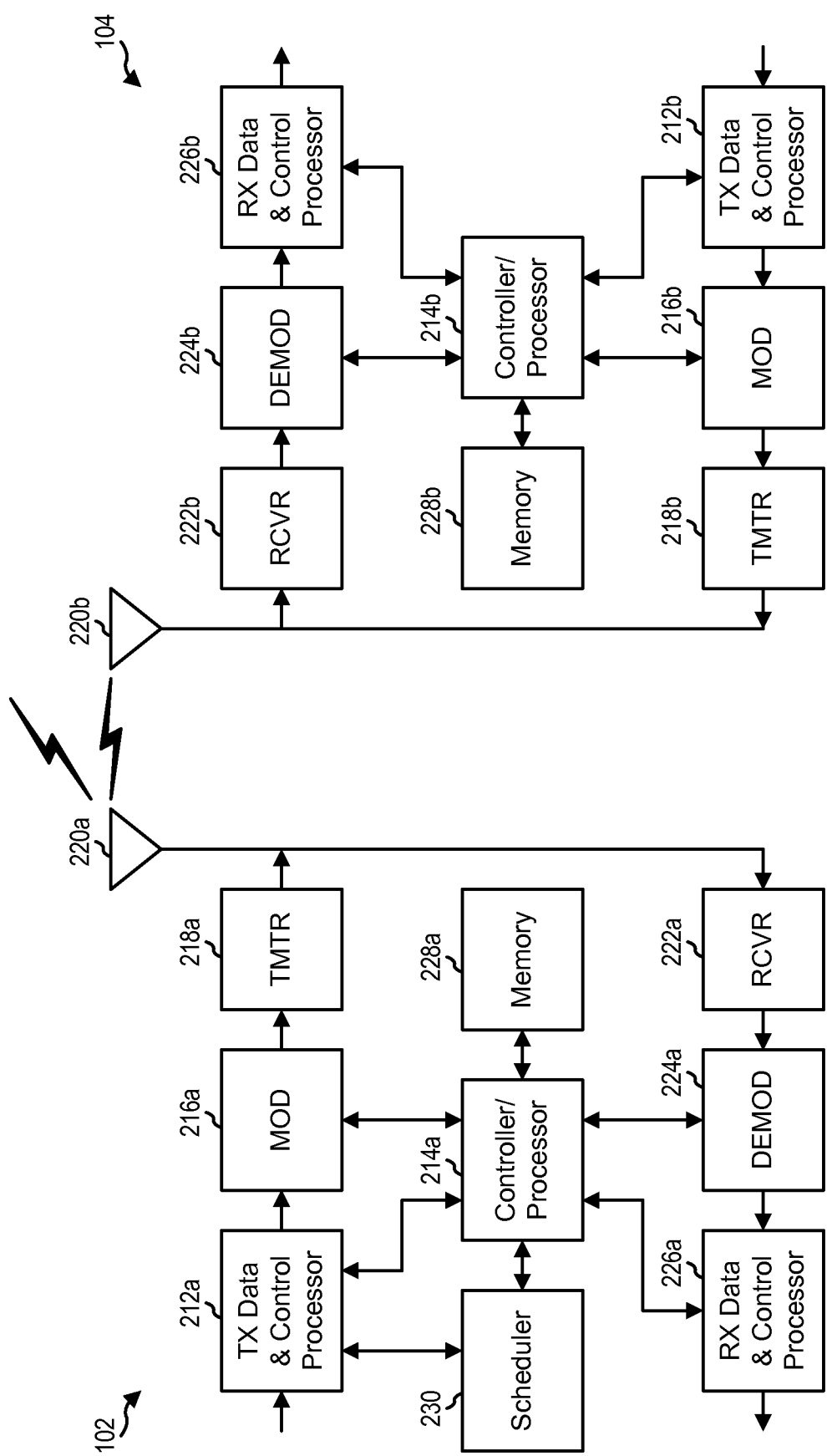
FIG. 2 illustrates a block diagram of a design of a base station and a mobile device.

FIG. 2 shows a block diagram of a design of a base station 102 and a mobile device 104, which may be one of the base stations 102 and one of the mobile devices 104 in FIG. 1. At the base station 102, a transmit (TX) data and control processor 212a may receive traffic data from a data source (not shown) and/or control information from a controller/processor 214a. The processor 212a may process (e.g., format, encode, interleave, and symbol map) the traffic data and control information and provide modulation symbols. A modulator (MOD) 216a may process the modulation symbols (e.g., for OFDM) and provide output chips. A transmitter (TMTR) 218a may process (e.g., convert to analog, amplify, filter, and upconvert) the output chips and generate a downlink signal, which may be transmitted via an antenna 220a.

At the mobile device 104, an antenna 220b may receive the downlink signals from the base station 102 and other base stations 102 and may provide a received signal to a receiver (RCVR) 222b. The receiver 222b may condition (e.g., filter, amplify, downconvert, and digitize) the received signal and provide received samples. A demodulator (DEMOD) 224b may process the received samples (e.g., for OFDM) and provide demodulated symbols. A receive (RX) data and control processor 226b may process (e.g., symbol demap, deinterleave, and decode) the demodulated symbols to obtain decoded data and control information for the mobile device 104.

On the uplink, at the mobile device 104, data and control information to be sent by the mobile device 104 may be processed by a TX data and control processor 212b, modulated by a modulator 216b, conditioned by a transmitter 218b, and transmitted via an antenna 220b. At the base station 102, the uplink signals from the mobile device 104 and possibly other mobile devices 104 may be received by an antenna 220a, conditioned by a receiver 222a, demodulated by a demodulator 224a, and processed by an RX data and control processor 226a to recover the data and control information sent by the mobile device 104. In general, the processing for uplink transmission may be similar to or different from the processing for downlink transmission.

Controllers/processors 214a and 214b may direct the operation at the base station 102 and the mobile device 104, respectively. Memories 228a and 228b may store data and program codes for the base station 102 and the mobile device 104, respectively. A scheduler 230 may schedule mobile devices 104 for downlink and/or uplink transmission and may provide assignments of system resources.

The term "4G," which is an abbreviation for fourth generation, is a term used to describe the next complete evolution in wireless communications. A 4G system may be able to provide a comprehensive Internet Protocol (IP) solution where voice, data and streamed multimedia can be given to users at higher data rates than previous generations. Examples of 4G systems include WiMAX and 3GPP Long Term Evolution (LTE).

The term "3G" refers to the third generation of mobile phone standards and technologies, whereas the term "2G" refers to the second generation of mobile phone standards and technologies. Examples of 3G systems include the Universal Mobile Telecommunications System (UMTS) and CDMA2000. Examples of 2G systems include the Global System for Mobile communications (GSM) and cdmaOne.

The present disclosure relates to mobile devices that are configured for operation in a 4G network. Such mobile devices may also be configured for operation in one or more 2G and/or 3G networks in addition to one or more 4G networks. Mobile devices that are configured in this manner may be referred to as "multi-mode" devices.

One significant issue for mobile devices is to quickly find a serving system that the user prefers to use. This issue may arise after power up, when the device needs a system re-selection after losing the current serving system, etc. Being able to quickly find a serving system that the user prefers to use enables the device to serve the user quickly and reduces the power consumption.

To the user, the issue is how to dynamically select service provider(s) and service(s) based on what the user wants, rather than having the choice of service provider(s)/service(s) fixed by the network operators. The following are some examples:

Example 1

User A uses service provider X for basic web and email service, and also likes to use service provider Y for IPTV programs.

Example 2

User B wants to change the basic data service for web and email from service provider N to service provider M because service provider M now offers a cheaper monthly fee with higher speed.

Example 3

A new service provider S is now available with a 3D interactive gaming service. User C gets notified and wants to sign up for the service.

The present disclosure proposes systems, methods and apparatus for providing these types of capabilities. More specifically, the present disclosure relates to dynamic service-based system selection and determination. The techniques disclosed herein may be utilized by multi-mode mobile devices, which may be configured for operation in one or more 2G and/or 3G networks in addition to one or more 4G networks.

In the present disclosure, the term Network Access Provider (NAP) refers to an entity that provides a physical link to a wireless communication network. The term Network Service Provider (NSP) refers to an entity that provides services (e.g., Internet Protocol television (IPTV), 3D gaming, World Wide Web access, email, instant messaging, Voice over IP (VoIP), etc.) via a wireless communication network. An NAP and an NSP can be the same entity or different entities.

Figure 3:
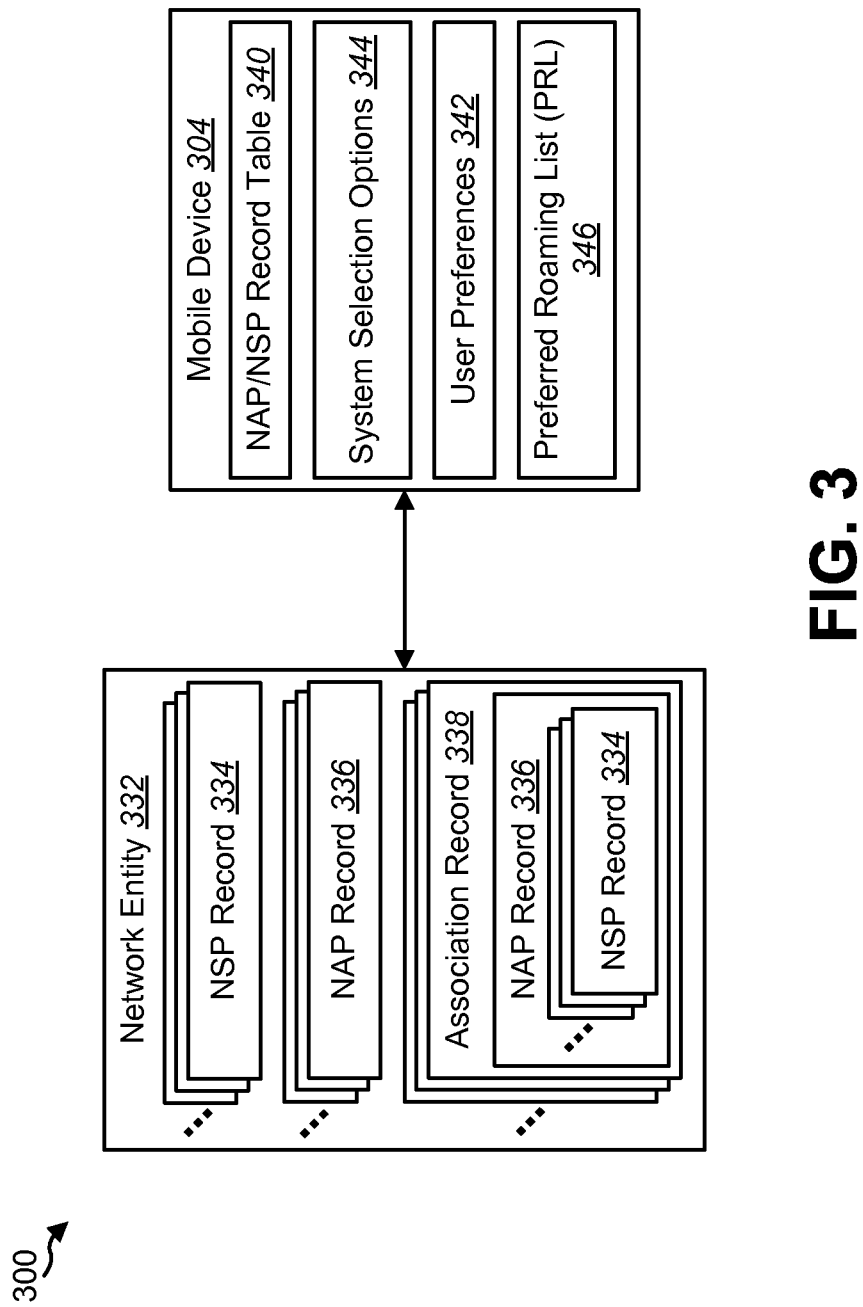
FIG. 3 illustrates an example of a system that is configured for facilitating dynamic service-based system selection and determination.

Reference is now made to FIG. 3. FIG. 3 illustrates an example of a system 300 that is configured for facilitating dynamic service-based system selection and determination.

Such a system 300 may include multiple network entities 332 and multiple mobile devices 304. For simplicity, however, a single network entity 332 and a single mobile device 304 are shown in FIG. 3.

The network entity 332 and the mobile device 304 may be configured for operation in a high-speed wireless communication network, such as WiMAX or another type of 4G network. The mobile device 304 may be a multi-mode device, i.e., it may be configured for operation in various 2G and/or 3G networks in addition to one or more 4G networks.

The network entity 332 is shown with multiple Network Service Provider (NSP) records 334 and multiple Network Access Provider (NAP) records 336. Each NSP record 334 may include information about a particular NSP, and each NAP record 336 may include information about a particular NAP. Examples of the contents of the NSP records 334 and the NAP records 336 will be provided below.

One NAP can support multiple NSPs. Accordingly, the network entity 332 is also shown with multiple association records 338. Each association record 338 may indicate an association between a particular NAP record 336 and one or more NSP records 334. In this context, an association between an NAP record 336 and an NSP record 334 may indicate that the NSP to which the NAP record 336 refers is available via the NAP to which the NAP record 336 refers.

The network entity 332 may be configured to transmit one or more NAP records 336 and associated NSP records 334 to mobile devices 304. There are many ways that this may be accomplished. The NAP records 336 and associated NSP records 334 may be transmitted to a mobile device 304 via an over-the-air connection or via a local cabled connection. The NAP records 336 and the associated NSP records 334 may be broadcast to multiple mobile devices 304. In a WiMAX system, the NAP records 336 and the associated NSP records 334 may be included in a downlink MAP (DL-MAP) message that is transmitted to mobile devices 304.

The mobile device 304 may be configured to receive NAP records 336 and associated NSP records 334 from the network entity 332, and to decode the NAP records 336 and associated NSP records 334. The mobile device 304 may also be configured to create an NAP/NSP record table 340. The NAP/NSP record table 340 may be created based on the information that is contained within the NAP records 336 and the associated NSP records 334. For each available NAP, the NAP/NSP record table 340 may indicate the NSPs that are associated with the NAP, as well as information about the services that are provided by those NSPs.

The mobile device 304 may also be configured to determine user preferences 342 regarding various options 344 for system selection. This may involve presenting information to the user about the system selection options 344, and receiving user input regarding which system selection options 344 are preferred. The system selection options 344 may be determined based on information in the NAP/NSP record table 340. Examples of system selection options 344 will be provided below.

The mobile device 304 may also be configured to create a preferred roaming list (PRL) 346 based on the user preferences 342 that are determined. Information in the NAP records 336 (e.g., network parameters) may be used to create the PRL 346.

The PRL 346 may be used to perform network/channel scanning and to find serving systems. The PRL 346 may be used to quickly find a serving system after power up, when the device 304 needs a system re-selection after losing the current serving system, etc.

From time to time, the NAP records 336 and the NSP records 334 may be updated. When this occurs, the updated NAP records 336 and associated NSP records 334 may be transmitted to the mobile device 304. The mobile device 304 may be configured to dynamically update the data on the mobile device 304 based on the updated NAP records 336 and the associated NSP records 334. For example, when updated NAP records 336 and associated NSP records 334 are received, the NAP/NSP record table 340 may be updated, which may cause the system selection options 344 to be updated as well. The user may be given the opportunity to update his/her preferences 342 based on the updated system selection options 344. Based on the updated user preferences 342, the PRL 346 may be updated as well.

After a mobile device 304 has attached to a particular network via an NAP and is receiving service(s) from an NSP, the mobile device 304 may receive advertisements for additional services offered by the same NSP or one or more additional NSPs. Information about such services may then be presented to the user, and the user may be given the option to purchase these services.

For example, when a mobile device 304 attaches to a particular network, the mobile device 304 may be only using the network as a broadband IP service. The network may then advertise that other services are available to be provided. Such advertisements may be provided via the NSP that the mobile device 304 is currently using.

Reference is now made to FIG. 4. FIG. 4 illustrates an example of a method 400 for facilitating dynamic service-based system selection and determination. The method 400 may be implemented by a mobile device 304. The method 400 shown in FIG. 4 summarizes the functions of the mobile device 304 that were described above in connection with FIG. 3.

The mobile device 304 may receive 402 NAP records 336 and NSP records 334 from one or more network entities 332. The mobile device 304 may decode 404 the NAP records 336 and the NSP records 334 that it receives, and create 406 an NAP/NSP record table 340 based on the decoded NAP records 336 and NSP records 334.

The NAP/NSP record table 340 may be used to determine 408 user preferences 342 regarding system selection. A preferred roaming list (PRL) 346 may be created 410 based on user preferences 342. The PRL 346 may be used to perform 412 network/channel scanning and to find serving systems. However, it is not necessary that the PRL 346 is created. The NAP/NSP record table 340 may be used directly for system selection.

From time to time, the NAP records 336 and the NSP records 334 may be updated. When this occurs, the mobile device 304 may receive 414 the updated NAP records 336 and the updated NSP records 334, and dynamically update 416 data on the mobile device 304 (e.g., the NAP/NSP record table 340, the system selection options 344, the user preferences 342, the PRL 346) based on the updated NAP records 336 and the updated NSP records 334.

The method 400 of FIG. 4 described above may be performed by various hardware and/or software component(s) and/or module(s) corresponding to the means-plus-function blocks 500 illustrated in FIG. 5. In other words, blocks 402 through 416 illustrated in FIG. 4 correspond to means-plus-function blocks 502 through 516 illustrated in FIG. 5.

Figure 6:
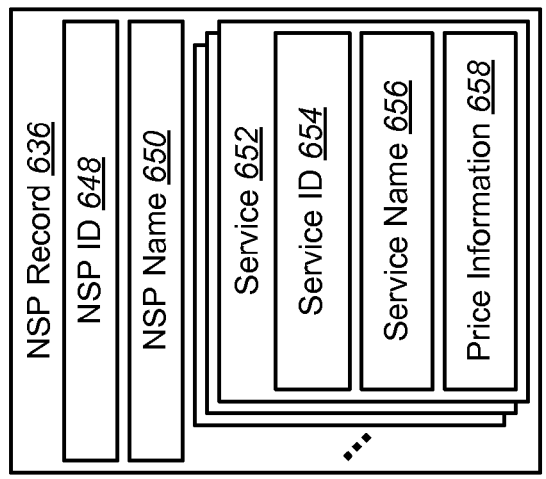
FIG. 6 illustrates an example of an NSP record.

Reference is now made to FIG. 6. FIG. 6 illustrates an example of an NSP record 636. As indicated above, an NSP record 636 may include information about a particular NSP. More specifically, an NSP record 636 may include an identifier (ID) 648 for the NSP, as well as the name 650 of the NSP.

In addition, an NSP record 636 may include information about one or more services 652 that are offered by the NSP. The information that is included about a particular service 652 may include an identifier (ID) 654 for the service, the name 656 of the service, price information 658 about the service, and so forth.

Instead of separately identifying each individual service 652, an NSP record 636 may include a reference to a package of multiple services 652. For example, one type of service package may include all available services 652 (e.g., IPTV, 3D gaming, World Wide Web access, email, instant messaging, VoIP, etc.), whereas another type of service package may include a subset of available services 652 (e.g., World Wide Web access, email, instant messaging, and VoIP, but not IPTV or 3D gaming).

Figure 7:
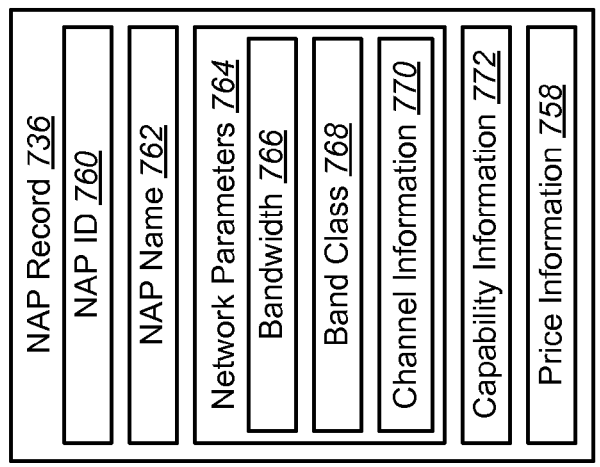
FIG. 7 illustrates an example of an NAP record.

Reference is now made to FIG. 7. FIG. 7 illustrates an example of an NAP record 736. As indicated above, an NAP record 736 may include information about a particular NAP. More specifically, an NAP record 736 may include an identifier (ID) 760 for the NAP, as well as the name 762 of the NAP. In addition, an NAP record 736 may include information about one or more network parameters 764 for the NAP, such as bandwidth 766, band class 768, channel information 770, and so forth. The network parameters 764 in the NAP record 736 may be used to create the preferred roaming list. An NAP record 736 may also include capability information 772 (e.g., maximum bit rate) and price information 758 concerning the NAP.

Figure 8:
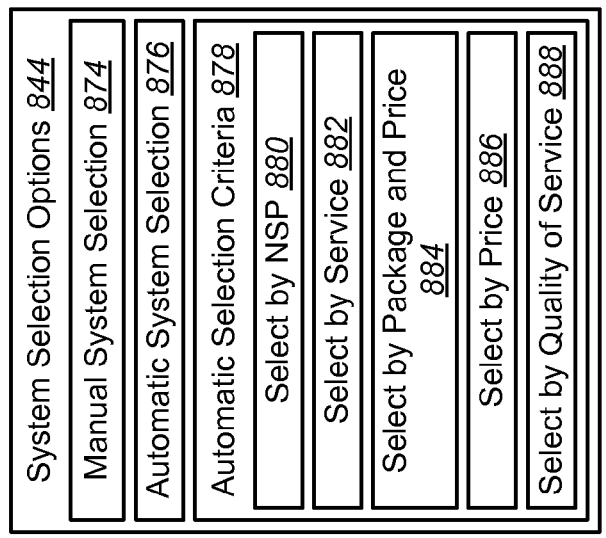
FIG. 8 illustrates some examples of system selection options.

Reference is now made to FIG. 8. FIG. 8 illustrates some examples of system selection options 844. The depicted system selection options 844 include an option 874 for manual system selection, and an option 876 for automatic system selection. If the user chooses the option 874 for manual system selection, then the user may manually select the NAP and NSP(s) that are utilized. However, if the user chooses the option 876 for automatic system selection, then the mobile device may automatically select the NAP and NSP(s) that are utilized, possibly based on certain automatic selection criteria 878 that the user provides.

Some examples of automatic selection criteria 878 are shown in FIG. 8, including an option 880 to select by NSP, an option 882 to select by service, an option 884 to select by package and price, an option 886 to select by price, an option 888 to select by quality of service, etc.

For example, if the specified criterion 878 is the option 880 to "select by NSP," then the user may be prompted to specify one or more preferred NSPs. If multiple NSPs are specified, then the user may be prompted to rank the NSPs. The mobile device may then automatically select the NAP that offers the specified NSP(s). If multiple NAPs offer the specified NSP(s), then other criteria may be used to determine which NAP is selected.

As another example, if the specified criterion 878 is the option 884 to "select by price" with respect to a particular service, then the mobile device may determine the NSP that provides the desired service at the cheapest price. The mobile device may then automatically select this NSP and the corresponding NAP that provides access to this NSP.

Figure 9:
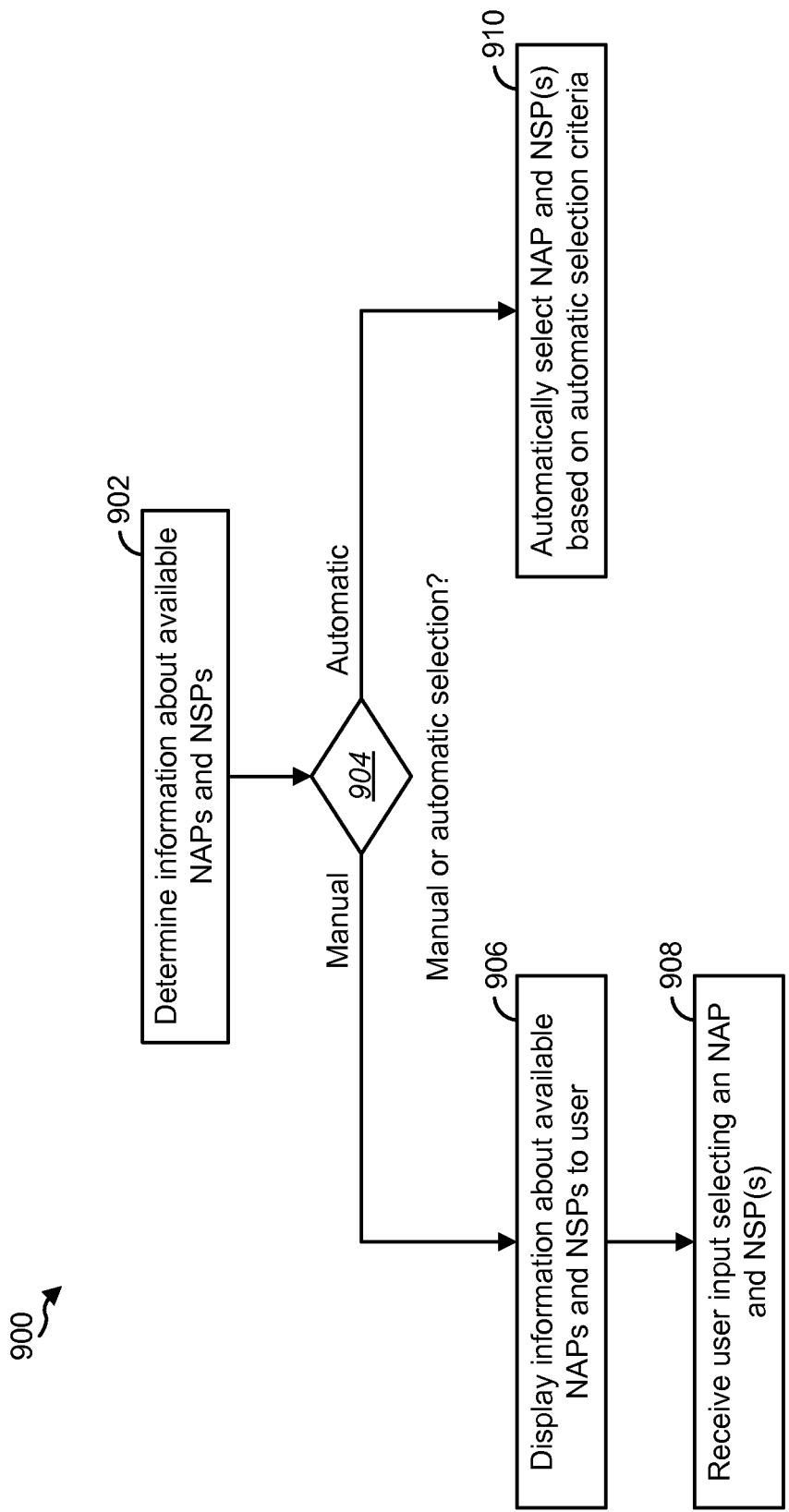
FIG. 9 illustrates an example of a method for locating a serving system in accordance with the present disclosure.

Reference is now made to FIG. 9. FIG. 9 illustrates an example of a method 900 for locating a serving system in accordance with the present disclosure. The method 900 may be implemented by a mobile device after power up, when the device needs a system re-selection after losing the current serving system, etc.

The mobile device may determine 902 information about available NAPs and NSPs. This is not merely limited to the NAPs and NSPs that are already provisioned on the mobile device; rather, information about other NAPs and NSPs that are not provisioned on the mobile device may also be determined. This may involve referring to an NAP/NSP record table that has been created based on NAP records and NSP records that have been received. Alternatively, or in addition, this may involve actively searching for information about available NAPs and NSPs.

The mobile device may determine 904 whether the user has indicated a preference for manual or automatic selection. If manual selection has been chosen, then the mobile device may display 906 information about available NAPs and NSPs to the user, and receive 908 user input selecting an NAP and NSPs. However, if automatic selection has been chosen, then the mobile device may automatically select 910 an NAP and NSPs based on automatic selection criteria that have been specified by the user.

Figure 10:
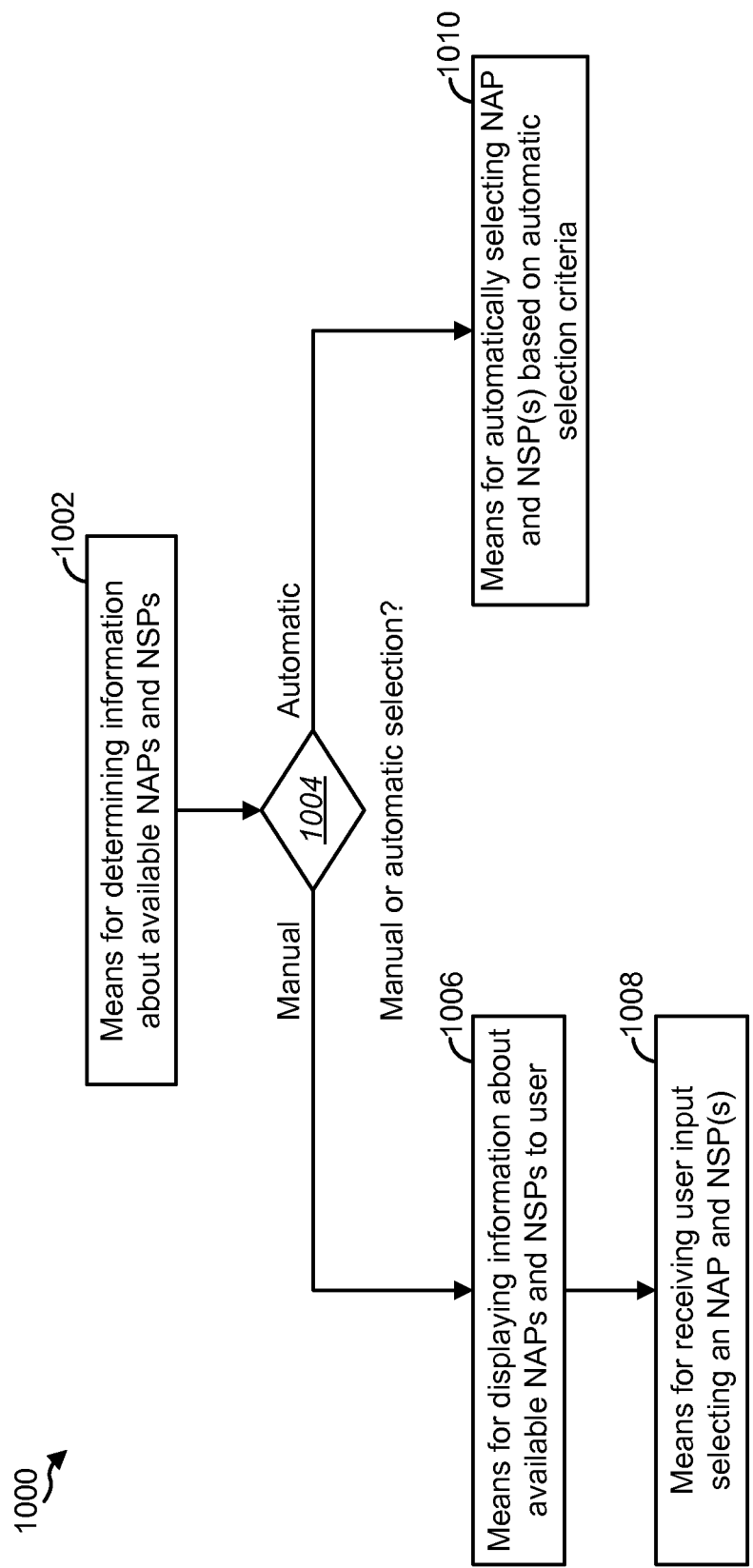
FIG. 10 illustrates means-plus-function blocks corresponding to the method of FIG. 9.

The method 900 of FIG. 9 described above may be performed by various hardware and/or software component(s) and/or module(s) corresponding to the means-plus-function blocks 1000 illustrated in FIG. 10. In other words, blocks 902 through 910 illustrated in FIG. 9 correspond to means-plus-function blocks 1002 through 1010 illustrated in FIG. 10.

Figure 11:
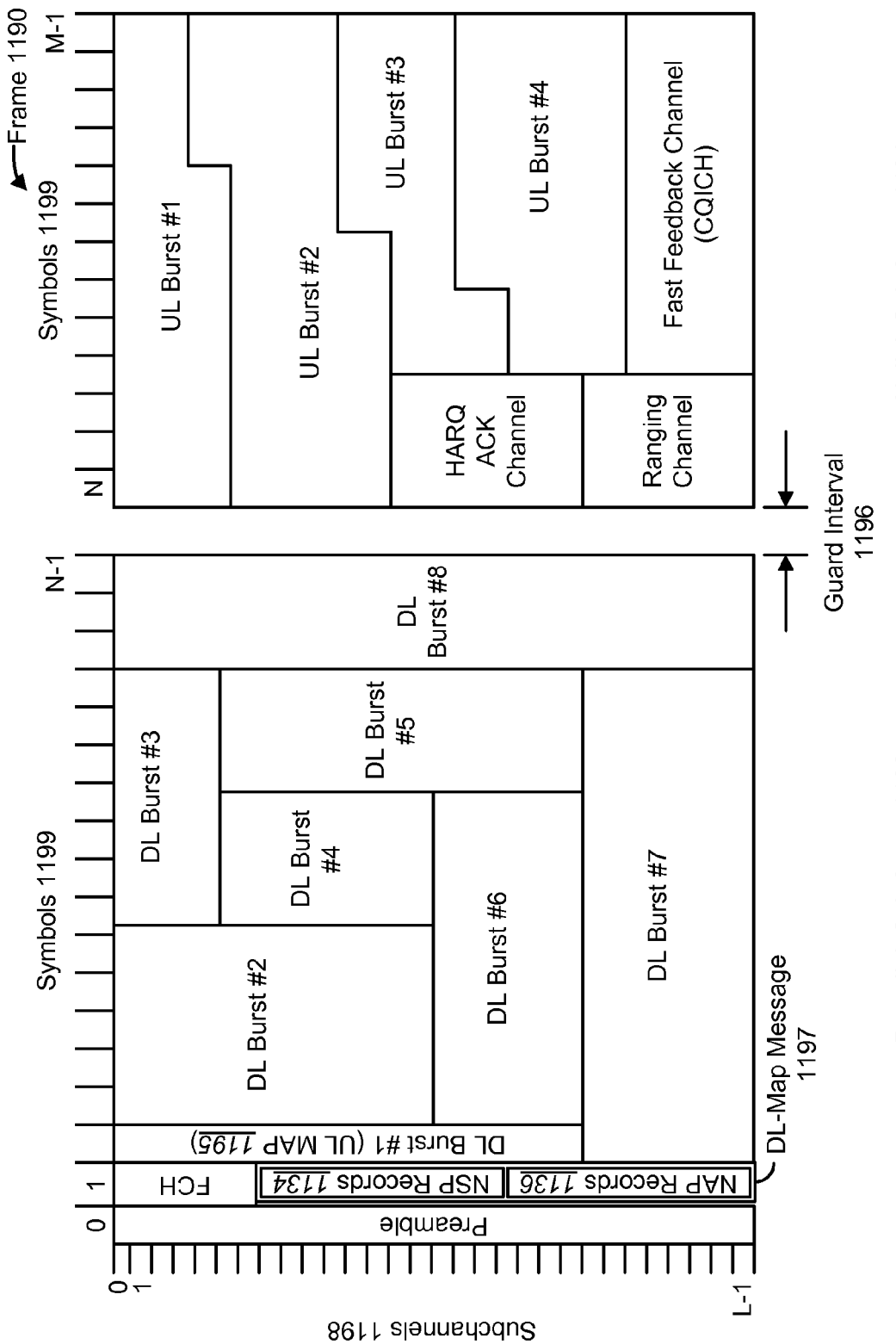
FIG. 11 illustrates an example showing certain aspects of the structure of a frame in a WiMAX network.

The techniques disclosed herein may be utilized in a WiMAX network. Reference is now made to FIG. 11. FIG. 11 illustrates an example showing certain aspects of the structure of a frame 1190 in a WiMAX network. The frame 1190 includes a downlink sub-frame 1192 and an uplink sub-frame 1194, separated by a guard interval 1196. The frame 1192 is transmitted over L subchannels 1198. There are a total of M symbols 1199 in the frame, N symbols 1199 in the downlink sub-frame 1192 and M-N symbols 1199 in the uplink sub-frame 1194.

Multiple users are allocated data regions within the frame 1192, and these allocations are specified in the downlink MAP (DL-MAP) message 1197 and the uplink MAP (UL-MAP) message 1195. The MAP messages 1197, 1195 include the burst profile for each user, which defines the modulation and coding schemes that are used.

In accordance with the present disclosure, NAP records 1136 and NSP records 1134 may be included within the DL-MAP message 1197. Thus, by decoding the DL-MAP message 1197, the mobile device may be able to determine information about available NAPs and NSPs, and then create an NAP/NSP record table based on this information.

The NAP ID may be broadcasted as the Base Station ID. The NSP ID may be unicasted through the Subscriber Station Basic Capability Response (SBC-RSP) message and the Service Identity Information (SII-ADV) message. Those messages may be extended to include the information disclosed herein.

Figure 12:
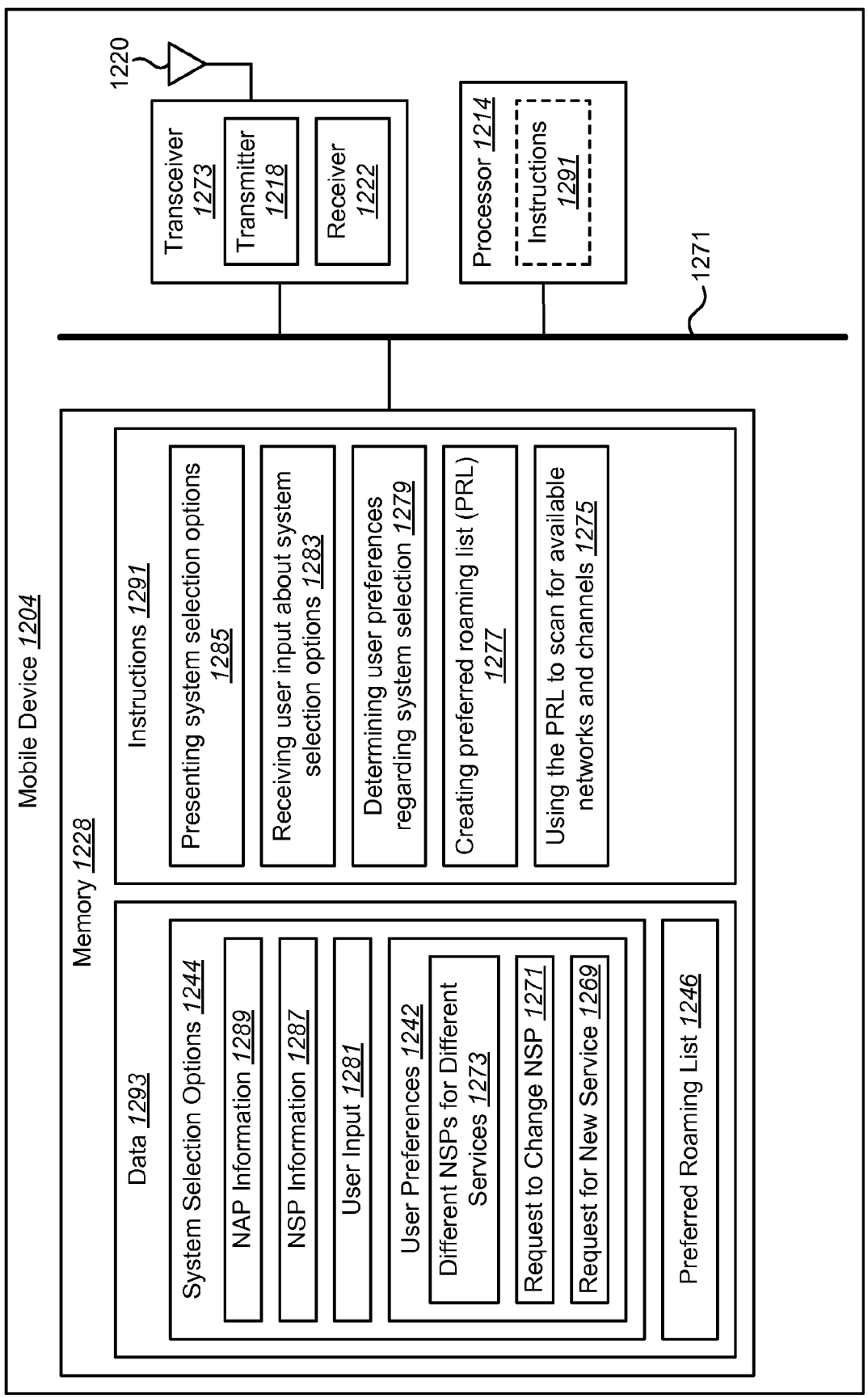
FIG. 12 illustrates certain components that may be included within a mobile device that is configured for facilitating dynamic service-based system selection and determination in accordance with the present disclosure.

Reference is now made to FIG. 12. FIG. 12 illustrates certain components that may be included within a mobile device 1204 that is configured for facilitating dynamic service-based system selection and determination in accordance with the present disclosure.

The mobile device 1204 includes a processor 1214. The processor 1214 may be a general purpose single- or multi-chip microprocessor (e.g., an ARM), a special purpose microprocessor (e.g., a digital signal processor (DSP)), a microcontroller, a programmable gate array, etc. The processor may be referred to as a central processing unit (CPU). Although just a single processor is shown in the mobile device 1204 of FIG. 12, in an alternative configuration, a combination of processors 1214 (e.g., an ARM and DSP) could be used.

The mobile device 1204 also includes memory 1228. The memory 1228 may be any electronic component capable of storing electronic information. The memory 1228 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1293 and instructions 1291 may be stored in the memory 1228. The instructions 1291 may be executable by the processor 1214 to implement various functions. Executing the instructions 1291 may involve the use of the data 1293 that is stored in the memory 1228.

The mobile device 1204 may include instructions 1285 for presenting system selection options 1244 to a user based on information 1289, 1287 that is received about Network Access Providers (NAPs) and Network Service Providers (NSPs). The NAP information 1289 may take the form of the NAP records discussed previously. Similarly, the NSP information 1287 may take the form of the NSP records discussed previously.

The mobile device 1204 may also include instructions 1283 for receiving user input 1281 about the system selection options 1244. The user may be permitted to provide input about specific services offered by specific NSPs.

The mobile device 1204 may also include instructions 1279 for determining user preferences 1242 regarding system selection based on the user input 1281. Many different kinds of user preferences 1242 may be determined. For example, the user preferences 1242 may include a user selection 1273 of different NSPs for different services (as described in Example 1 above). As another example, the user preferences 1242 may include a request 1271 to change the NSP that is utilized for a particular service (as described in Example 2 above). As yet another example, the user preferences 1242 may include a request 1269 to sign up for a new service (as described in Example 3 above).

The mobile device 1204 may also include instructions 1277 for creating a preferred roaming list (PRL) 1246 based on the user preferences 1242. Further, the mobile device 1204 may also include instructions 1275 for using the PRL 1246 to scan for available networks and channels and to find serving systems.

Other types of instructions 1291 and data 1293 that are relevant to implementing the techniques described herein may also be included in the memory 1228.

The mobile device 1204 may also include a transmitter 1218 and a receiver 1222 to allow transmission and reception of signals between the mobile device and a remote location. The transmitter 1218 and receiver 1222 may be collectively referred to as a transceiver 1277. An antenna 1220 may be electrically coupled to the transceiver 1277. The mobile device 1204 may also include (not shown) multiple transmitters, multiple receivers, multiple transceivers and/or multiple antenna.

The various components of the mobile device 1204 may be coupled together by one or more buses, which may include a power bus, a control signal bus, a status signal bus, a data bus, etc. For the sake of clarity, the various buses are illustrated in FIG. 12 as a bus system 1275.

The techniques disclosed herein may provide a number of advantages relative to known approaches. For example, the techniques disclosed herein may allow a user to select the services that she/he wants in addition to operators and service providers.

Additionally, information about network operators, service providers, and their service and price information can be added, deleted, and changed. The new information can be communicated to the mobile devices via a local connection and/or via an over-the-air connection. Mobile devices can dynamically update the operator, service provider and service information and present the updated information to the users. This allows new operators, service providers, and services to be introduced to the users easily. This is especially useful with the rollout of 4G systems.

Another potential advantage of the techniques disclosed herein is that the mobile devices can dynamically update the preferred roaming list to enable efficient channel scanning. This may help to reduce the power consumption of the mobile device and facilitate faster serving system selection.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure. For example, a reference to "mobile device 1204" refers to the specific mobile device that is shown in FIG. 12. However, the use of "mobile device" without a reference number refers to any mobile device that is appropriate for the context in which the term is used, and is not limited to any particular mobile device shown in the Figures.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 4 and 9, can be downloaded and/or otherwise obtained by a mobile device as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for facilitating dynamic service-based system selection and determination, the method being implemented by a mobile device, the method comprising:
presenting system selection options based on information that is received about Network Access Providers (NAPs) and Network Service Providers (NSPs);

receiving user input about the system selection options, wherein the user is permitted to provide input about specific services offered by specific NSPs;

determining user preferences regarding system selection based on the user input;

creating a preferred roaming list (PRL) based on the user preferences;

using the PRL to scan for available networks and channels and to find serving systems;

determining information about available NAPs and NSPs related to the available networks and channels, wherein an option for manual system selection is selected;

displaying information about the available NAPs and NSPs; and receiving input selecting an NAP and at least one NSP.

2. The method of claim 1, further comprising creating an NAP/NSP record table based on NAP records and NSP records that are received by the mobile device.

3. The method of claim 1, further comprising:
receiving updated information about the NAPs and the NSPs; and
dynamically updating the system selection options based on the updated information.

4. The method of claim 1, wherein the mobile device is configured for operation in a high-speed wireless communication network, and wherein the information about the NAPs and the NSPs is included in a downlink MAP (DL-MAP) message that is received by the mobile device.

5. The method of claim 1, wherein the user preferences comprise a user selection of different NSPs for different services.

6. The method of claim 1, wherein the user preferences comprise a request to change the NSP that is utilized for a particular service.

7. The method of claim 1, wherein the user preferences comprise a request to sign up for a new service.

8. The method of claim 1, wherein the mobile device is configured for operation in a fourth generation (4G) wireless communication network, and wherein the mobile device is also configured for operation in at least one second generation (2G) or third generation (3G) wireless communication network.

9. A mobile device configured for facilitating dynamic service-based system selection and determination, comprising:
a processor;
memory in electronic communication with the processor;
instructions stored in the memory, the instructions being executable by the processor to:
present system selection options based on information that is received about Network Access Providers (NAPs) and Network Service Providers (NSPs);
receive, from an input device, user input about the system selection options, wherein the user is permitted to provide input about specific services offered by specific NSPs;
determine user preferences regarding system selection based on the user input;
create a preferred roaming list (PRL) based on the user preferences;
use a receiver to scan for available networks and channels using the PRL and to find serving systems using the PRL;
determine information about available NAPs and NSPs related to the available networks and channels, wherein an option for manual system selection is selected;
provide information about the available NAPs and NSPs to a display; and
receive, from the input device, input selecting an NAP and at least one NSP.

10. The mobile device of claim 9, wherein the instructions are also executable to create an NAP/NSP record table based on NAP records and NSP records that are received by the mobile device.

11. The mobile device of claim 9, wherein the instructions are also executable to:
receive updated information about the NAPs and the NSPs; and
dynamically update the system selection options based on the updated information.

12. The mobile device of claim 9, wherein the mobile device is configured for operation in a high-speed wireless communication network, and wherein the information about the NAPs and the NSPs is included in a downlink MAP (DL-MAP) message that is received by the mobile device.

13. The mobile device of claim 9, wherein the user preferences comprise a user selection of different NSPs for different services.

14. The mobile device of claim 9, wherein the user preferences comprise a request to change the NSP that is utilized for a particular service.

15. The mobile device of claim 9, wherein the user preferences comprise a request to sign up for a new service.

16. The mobile device of claim 9, wherein the mobile device is configured for operation in a fourth generation (4G) wireless communication network, and wherein the mobile device is also configured for operation in at least one second generation (2G) or third generation (3G) wireless communication network.

17. A mobile device configured for facilitating dynamic service-based system selection and determination, comprising:
means for presenting system selection options based on information that is received about Network Access Providers (NAPs) and Network Service Providers (NSPs);
means for receiving user input about the system selection options, wherein the user is permitted to provide input about specific services offered by specific NSPs;
means for determining user preferences regarding system selection based on the user input;
means for creating a preferred roaming list (PRL) based on the user preferences;
means for using the PRL to scan for available networks and channels and to find serving systems;
means for determining information about available NAPs and NSPs related to the available networks and channels, wherein an option for manual system selection is selected;
means for displaying information about the available NAPs and NSPs; and
means for receiving input selecting an NAP and at least one NSP.

18. The mobile device of claim 17, further comprising creating an NAP/NSP record table based on NAP records and NSP records that are received by the mobile device.

19. The mobile device of claim 17, further comprising:
means for receiving updated information about the NAPs and the NSPs; and
means for dynamically updating the system selection options based on the updated information.

20. A computer-program product for facilitating dynamic service based system selection and determination by a mobile device, the computer-readable product comprising a non-transitory computer-readable medium having instructions thereon, the instructions comprising:

code for presenting system selection options to a user based on information that is received about Network Access Providers (NAPs) and Network Service Providers (NSPs);

code for receiving user input about the system selection options, wherein the user is permitted to provide input about specific services offered by specific NSPs;

code for determining user preferences regarding system selection based on the user input;

code for creating a preferred roaming list (PRL) based on the user preferences; and code for using the PRL to scan for available networks and channels and to find serving systems;

code for determining information about available NAPs and NSPs related to the available networks and channels, wherein an option for manual system selection is selected;

code for displaying information about the available NAPs and NSPs; and code for receiving input selecting an NAP and at least one NSP.

21. The computer-program product of claim 20, wherein the instructions further comprise code for creating an NAP/NSP record table based on NAP records and NSP records that are received by the mobile device.

22. The computer-program product of claim 20, wherein the instructions further comprise:

code for receiving updated information about the NAPs and the NSPs; and code for dynamically updating the system selection options based on the updated information.

\* \* \* \* \*